(12) United States Patent
Zhang

(10) Patent No.: US 9,532,437 B1
(45) Date of Patent: Dec. 27, 2016

(54) CONTROL PANEL AND CONTROLLING METHOD THEREOF

(71) Applicant: Enno Electronics Co., Ltd., Chengdu (CN)

(72) Inventor: Genyuan Zhang, Chengdu (CN)

(73) Assignee: Enno Electronics Co., Ltd., Chendu (CN)

( * ) Notice: Subject to any disclaimer, the term of this patent is extended or adjusted under 35 U.S.C. 154(b) by 0 days.

(21) Appl. No.: 15/089,466

(22) Filed: Apr. 1, 2016

(30) Foreign Application Priority Data

Dec. 15, 2015 (CN) .......................... 2015 1 0937813

(51) Int. Cl.
| | |
|---|---|
| H05B 37/02 | (2006.01) |
| F21V 23/04 | (2006.01) |
| H04L 12/28 | (2006.01) |
| H05B 33/08 | (2006.01) |
| F21K 99/00 | (2016.01) |
| F21V 23/00 | (2015.01) |

(52) U.S. Cl.
CPC .......... *H05B 37/0227* (2013.01); *F21K 9/135* (2013.01); *F21V 23/009* (2013.01); *F21V 23/0435* (2013.01); *H04L 12/282* (2013.01); *H05B 33/0845* (2013.01); *H04L 2012/2841* (2013.01)

(58) Field of Classification Search
CPC ............ H05B 33/0803; H05B 33/0824; H05B 33/0845; H05B 37/02; H05B 33/0842; H05B 37/0245; H05B 33/0815; H05B 37/0218; H05B 37/0227; H05B 37/0272; F21Y 2115/10; F21Y 2115/20; G02F 1/133305; G09G 3/3406; G09G 2320/0626; G09G 2330/021; G09G 2330/026; G09G 3/3611; H05K 3/361; H05K 5/0017

See application file for complete search history.

(56) References Cited

U.S. PATENT DOCUMENTS

| | | | | |
|---|---|---|---|---|
| 7,444,772 B2* | 11/2008 | Harasawa | .............. | A41D 1/005 313/504 |
| 8,178,802 B2* | 5/2012 | Roose | .................... | D06F 39/005 200/296 |
| 8,344,659 B2* | 1/2013 | Shimomura | ....... | H05B 37/0245 315/169.3 |
| 9,326,355 B2* | 4/2016 | Park | ...................... | D06F 39/005 |
| 2010/0289428 A1* | 11/2010 | Frazier | ...................... | F21K 9/00 315/294 |

* cited by examiner

*Primary Examiner* — Vibol Tan
(74) *Attorney, Agent, or Firm* — Ude Lu; Norton Rose Fulbright US LLP

(57) ABSTRACT

A control panel and a controlling method thereof. The control panel comprises: a panel body; an input unit, placed on the panel body, configured to obtain object input information and send the obtained object input information to a controller; the controller, placed on the panel body, for determining object configuring data corresponding to the object input information according to the object input information and pre-stored configuring data corresponding to the various input information, generating a display instruction according to the object configuring data, and sending the display instruction to a pulse driver; the pulse driver, connected with the controller, for adjusting a value of an output current value according to the display instruction and sending the output current corresponding to the adjusted value to a light emitting element; and the light emitting element, placed on the panel body and connected with the pulse driver.

19 Claims, 5 Drawing Sheets

CONTROL PANEL AND CONTROLLING METHOD THEREOF

CROSS REFERENCE TO RELATED APPLICATIONS

This application claims benefit from Chinese Patent Application No. 201510937813.8, filed Dec. 15, 2015, the entire disclosure of which is incorporated by reference herein.

FIELD

This disclosure herein relates to a technical field of intelligent home controlling, and specifically to a control panel and a controlling method thereof.

BACKGROUND

With the continuous improvement and development of the science and technology, the intelligent home technology has become an important developing direction for the lighting control technology. The intelligent controlling of the home devices is generally achieved by a control panel. The prior control panel generally includes a panel body, a plurality of press buttons on a front face of the panel body, and a LED light bar around each press button wherein the LED light bar can be used for lighting. However, the LED light bar on the prior control panel has a relatively high luminance, causing eyes of a person uncomfortable. In addition, the luminance of the LED light bar can not be adjusted, thus influencing the experience of the user.

SUMMARY

In the embodiments of the disclosure, a control panel and a controlling method thereof are provided to enable adjustment of the luminance of the light emitting element.

In an embodiment of the disclosure, a control panel is provided, comprising:
 a panel body;
 an input unit, placed on the panel body, for obtaining object input information and sending the obtained object input information to a controller;
 the controller, placed on the panel body, for determining object configuring data corresponding to the object input information according to the object input information and pre-stored configuring data corresponding to various input information, generating a display instruction according to the object configuring data, and sending the display instruction to a pulse driver;
 the pulse driver, connected with the controller, for adjusting a value of an output current according to the display instruction and sending the output current corresponding to the adjusted value to a light emitting element; and
 the light emitting element, placed on the panel body and connected with the pulse driver, for adjusting luminance according to the current output by the pulse driver and thus emitting light.

Preferably, the input unit comprises any one or more of an infrared sensor, at least one press button and an RF unit.

Preferably,
 when the input unit comprises the infrared sensor,
 the infrared sensor is used for detecting a distance from a user to the control panel by the infrared ray and sending the object input information to the controller according to the relation between the distance and a preset first threshold;

and/or
 the infrared sensor is used for detecting the light ray of the surroundings and sending the object input information to the controller according to the relation between an intensity of the light ray and a preset second threshold.

Preferably,
 when the input unit comprises the at least one press button,
 the input unit further comprises a detecting unit, and when one or more of the at least one press button is detected to perform a touch control operation, the detecting unit is used for determining information of the press button(s) performing the touch control operation(s) and sending the determined information as the object input information to the controller.

Preferably,
 when the input unit comprises the RF unit,
 the input unit further comprises a wireless WiFi chip;
 the RF unit is used for receiving a control instruction sent by an external apparatus and forwarding the control instruction to the wireless WiFi chip;
 the wireless WiFi chip is used for determining the object input information according to the control instruction and sending the determined input information to the controller.

Preferably,
 the panel body is provided, on its back face, with a bulge;
 the bulge is used for being embedded into an external support;
 the light emitting element is placed at an outer periphery of the bulge.

Preferably,
 the pulse driver comprises an NCP5623 chip;
 the light emitting element comprises at least one three-primary-colors LED;
 the controller is connected, via a datum signal terminal (SDA) and a clock signal terminal (SCL), with an SDA port and an SCL port of the pulse driver, respectively;
 the at least one three-primary-colors LED is connected with an LED port of the pulse driver.

In an embodiment of the disclosure, a controlling method of any one of the above-described control panels is provided, comprising: pre-setting the configuring data corresponding to various input information, and comprising:
 the input unit, when having obtained the object input information, sending the obtained object input information to the controller;
 the controller determining object configuring data corresponding to the object input information according to the object input information and the pre-set configuring data corresponding to various input information, generating the display instruction according to the object configuring data, and sending the display instruction to the pulse driver;
 the pulse driver adjusting the value of the output current according to the display instruction and controlling the light emitting element to adjust luminance according to the output current corresponding to the adjusted value and thus emit light.

Preferably,
 when the input unit comprises an infrared sensor, the controlling method further comprises: presetting a first threshold; and the step of the input unit, when having obtained the object input information, sending the obtained object input information to the controller, comprises: the infrared sensor determining a first object input information according to the relation between the first threshold and a detected distance from a user to the control panel, and sending the first object input information to the controller;

and/or when the input unit comprises an infrared sensor, the controlling method further comprises: presetting a second threshold; and the step of the input unit, when having obtained the object input information, sending the obtained object input information to the controller, comprises: the infrared sensor determining a second object input information according to the relation between the second threshold and a detected intensity of the light ray of the surroundings, and sending the second object input information to the controller;

and/or when the input unit comprises at least one press button, the step of the input unit, when having obtained the object input information, sending the obtained object input information to the controller, comprises: a detecting unit, when one or more of the at least one press button is detected to perform a touch control operation, determining information of the press button(s) performing the touch control operation (s) and sending the determined information as a third object input information to the controller;

and/or when the input unit comprises an RF unit, the step of the input unit, when having obtained the object input information, sending the obtained object input information to the controller, comprises: the RF unit receiving a control instruction sent by an external apparatus and forwarding the control instruction to a wireless WiFi chip, the wireless WiFi chip determining a fourth object input information according to the control instruction and sending the determined fourth object input information to the controller.

Preferably, when the panel body is provided on its back face with a bulge, the bulge is used for being embedded into an external support and the light emitting element is placed at an outer periphery of the bulge, the controlling method further comprises: after the step of controlling a light emitting element to emit light according to the output current corresponding to the adjusted value, reflecting the light from the light emitting element onto the external support to provide an indication to the user;

and/or when the pulse driver comprises an NCP5623 chip and the light emitting element comprises at least one three-primary-colors LED, the step of sending the display instruction to a pulse driver comprises: according to the display instruction, the controller sending a datum signal and a clock signal, by a datum signal terminal (SDA) and a clock signal terminal (SCL), to an SDA port and an SCL port of the pulse driver, respectively; and the step of controlling the light emitting element to emit light according to the output current corresponding to the adjusted value comprises: according to the output current corresponding to the adjusted value, the pulse driver sending the current via an LED port to the at least one three-primary-colors LED to make the at least one three-primary-colors LED emit light.

In the embodiment(s) of the disclosure, a control panel and a controlling method thereof are provided. The controller can, according to the pre-stored configuring data corresponding to various input information, determine different configuring data corresponding to the different input information, to generate the display instruction according to the configuring data. As the configuring data are different, the display information of the light emitting element will be different. The pulse driver may be used to adjust the value of the output current such that the adjusted value of the current can be used to control the light emitting element to emit light according to the display instruction sent by the controller, thereby enabling adjustment of luminance of the light emitting element and thus improving the experience of the user.

DETAILED DESCRIPTION

Hereinafter, the technical solutions according to the embodiments of the disclosure will be described clearly and completely in combination with the accompanying drawings of the embodiments of the disclosure. It is understandable that the described embodiments are only some embodiments of the disclosure, rather than all embodiments thereof. Based on the embodiments of the disclosure, all other embodiments obtained by those skilled in the art without any inventive work will fall in the protection scope of the disclosure.

Figure 1:
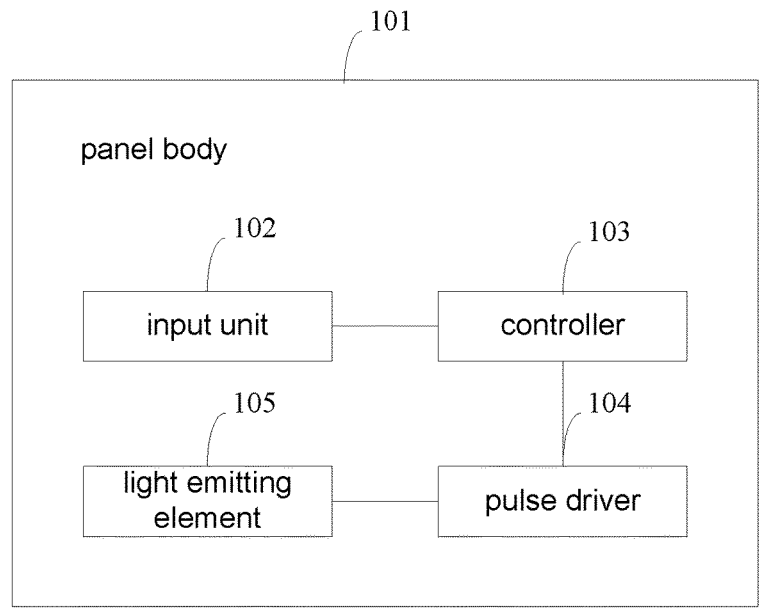
FIG. 1 is a structural schematic diagram of a control panel according to an embodiment of the disclosure.

As shown in FIG. 1, in an embodiment of the disclosure, a control panel is provided which may comprise:

a panel body 101;

an input unit 102, placed on the panel body 101, for obtaining object input information and sending the obtained object input information to a controller 103;

the controller 103, placed on the panel body 101, for determining object configuring data corresponding to the object input information according to the object input information and pre-stored configuring data corresponding to various input information, generating a display instruction according to the object configuring data, and sending the display instruction to a pulse driver 104;

the pulse driver 104, connected with the controller 103, for adjusting a value of an output current according to the display instruction and sending the output current corresponding to the adjusted value to a light emitting element 105; and the light emitting element 105, placed on the panel body 101 and connected with the pulse driver 104, for adjusting luminance according to the current output by the pulse driver 104 and thus emitting light.

According to the control panel provided in the embodiment, the controller can, according to the pre-stored configuring data corresponding to various input information, determine different configuring data corresponding to different input information, so as to generate the display instruction according to the configuring data. As the configuring data are different, the display information of the light emitting element will be different. The pulse driver may be used to adjust the value of the output current such that the adjusted value of the current can be used to control the light emitting element to emit light according to the display instruction sent by the controller, thereby enabling adjustment of luminance of the light emitting element and thus improving the experience of the user.

Figure 2:
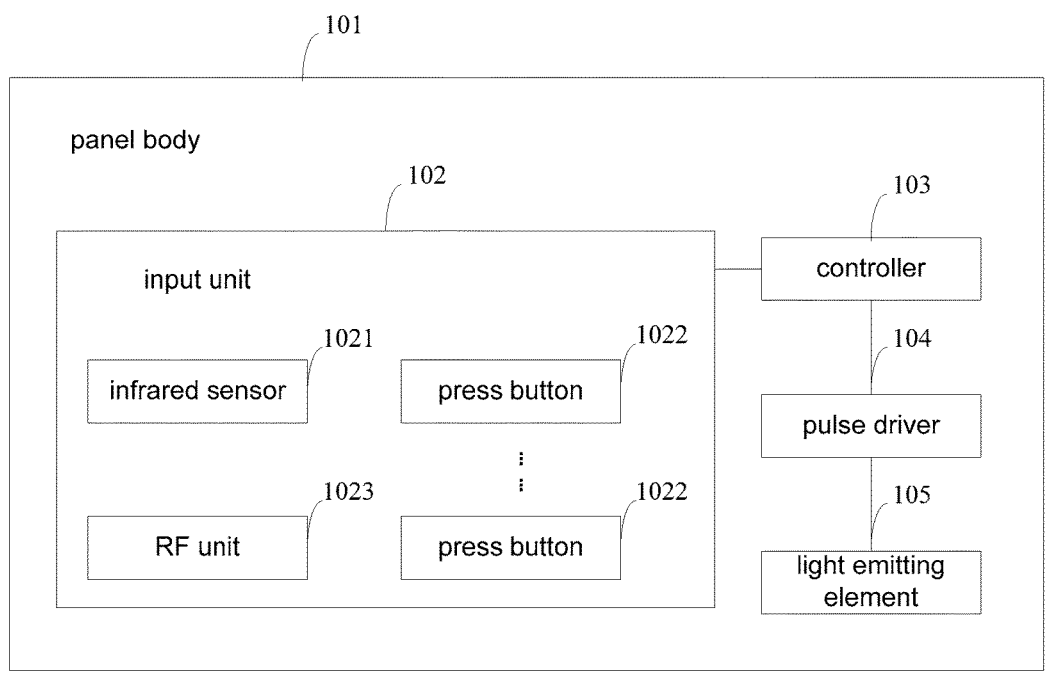
FIG. 2 is another structural schematic diagram of a control panel according to an embodiment of the disclosure.

Referring to FIG. 2, in an embodiment of the disclosure, the input unit is used for obtaining the object input information. Therefore, the input unit 102 may comprise any one or more of an infrared sensor 1021, at least one press button 1022 and a RF unit 1023.

The infrared sensor 1021 is a measuring system with the infrared ray as the medium. The infrared sensor can generate a distributed image of infrared radiation of the whole object, and can be used to determine a distance from the human body to the control panel where the human body is located, thus obtaining the object input information by means of the distance.

In an embodiment, the infrared sensor 1021 is used for detecting a distance from a user to the control panel where the user is located and sending the object input information to the controller 103 according to the distance and a preset first threshold.

Therefore, it needs to preset the first threshold which may equal to 2 meters, for example. When the infrared sensor 1021 detects that the distance from the user to the control panel is beyond the range of 2 meters, it may be configured to perform no operation. When the infrared sensor 1021 detects that the distance from the user to the control panel is within the range of 2 meters, it may be configured to consider that the user need to use the control panel at this time. Thus, the infrared sensor 1021 may send the object input information to the controller 103 wherein the object input information may comprise the actual distance from the user to the control panel.

In an embodiment, the light emitting element 105 comprised in the control panel can also achieve some respective functions for which it is necessary to preset the configuring data corresponding to various input information such that the controller 103, the pulse driver 104 and the light emitting element 105 can achieve the respective functions according to the configuring data. The pulse driver 104 may, by adjusting the duty cycle of the pulse, achieve adjustment of the current value, thus achieving the respective function(s).

For the object input information sent by the infrared sensor 1021 to the controller 103, the configuring data may be configured as follows: when the infrared sensor 1021 detects that the actual distance from the user to the control panel is within the range of 2 meters, the light emitting element 105 may be lighted up, and the lighting intensity, the lighting color (red, green or blue), the lighting frequency (flashing or continuous lighting), the lighting duration (until the actual distance from the user to the control panel is not within the range of 2 meters, or until the user does not operate the control panel for a preset time period, etc.), etc. Or, it may be configured according to the actual distance (within the range of 2 meters) from the user to the control panel that the smaller the actual distance is configured, the higher/lower the luminance of the light emitting element 105 is.

In an embodiment, the infrared sensor 1021 may be used for detecting the light ray of the surroundings and sending the object input information to the controller 103 according to the relation between an intensity of the light ray and a preset second threshold.

For example, the second threshold equals to 10 lux (wherein the lux is the unit of light intensity).

When the infrared sensor 1021 detects that the light ray of the surroundings has an light intensity not more than 10 lux, the object input information at this time will be determined wherein the object input information comprises the information of the light intensity not more than 10 lux and/or comprises an actual light intensity of the light ray of the surroundings.

For the object input information sent by the infrared sensor 1021 to the controller 103, the configuring data may be configured as follows: when the infrared sensor 1021 detects that the light intensity of the light ray of the surroundings is not more than 10 lux, the light emitting element 105 may be lighted up, and the lighting intensity, the lighting color, the lighting frequency, the lighting duration (for example, the duration configured by the user, or until the light intensity of the light ray of the surroundings is more than 10 lux, or until the user performs the operation of turning off the light emitting element 105), etc. Or, according to the actual light intensity, the light emitting element 105 may be lighted up such that the sum of light intensity of the light emitting element 105 and the actual light intensity satisfies a preset range. Such function can result in that when the light ray of the control panel's surroundings is relatively weak, the user may determine the position of the control panel according to the light of the light emitting element 105.

In an embodiment of the disclosure, the infrared sensor 1021 may be used for detecting both the distance from the user to the control panel and the light intensity of the light ray of the surroundings, and the corresponding configuring data may be configured.

In an embodiment, when the input unit 102 comprises the at least one press button 1022, the at least one press button 1022 may be a physical press button, or may be a virtual press button. In an embodiment, respective function(s) may be configured according to the action of simultaneous pressing down of one or more of the at least one press button 1022 and/or the duration of pressing down thereof, and the configuring data corresponding to the object input information may be configured according to different functions such that the controller 103, the pulse driver 104, the light emitting element 105 operate accordingly according to the configuring data, thus enabling the functions of showing and providing indication(s).

Figure 3A:
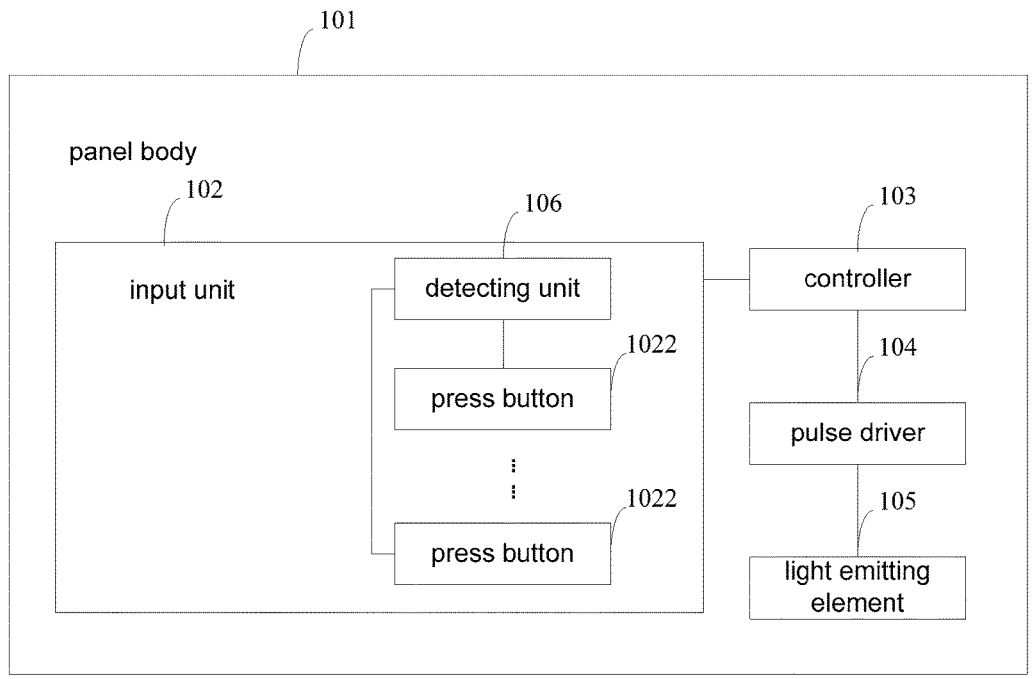
FIG. 3A is a further structural schematic diagram of a control panel according to an embodiment of the disclosure.

In an embodiment of the disclosure, the press button belongs to hardware and thus can not perform the operation of data processing. Therefore, referring to FIG. 3A, the input unit may further comprise: a detecting unit 106, and when one or more of the at least one press button 1022 is detected to perform a touch control operation, the detecting unit 106 is used for determining information of the press button(s) performing the touch control operation(s) and sending the determined information as the object input information to the controller.

In an embodiment, the configuring data may be configured as follows: when the press button performs a touch control operation, for each action of touch control, the light emitting element 105 may be lighted up, and the light intensity, the lighting duration, the lighting color, etc, may be configured. In this case, the pulse driver 104 may, by adjusting the duty cycle of the pulse, achieve adjustment of the output current, thus achieving the functions of the light intensity, the lighting duration and the lighting color. Or, when the light emitting element 105 is turned on, when the press button performs a touch control operation, the light emitting element 105 is controlled to maintain a strengthened light intensity for a period of time.

Figure 3B:
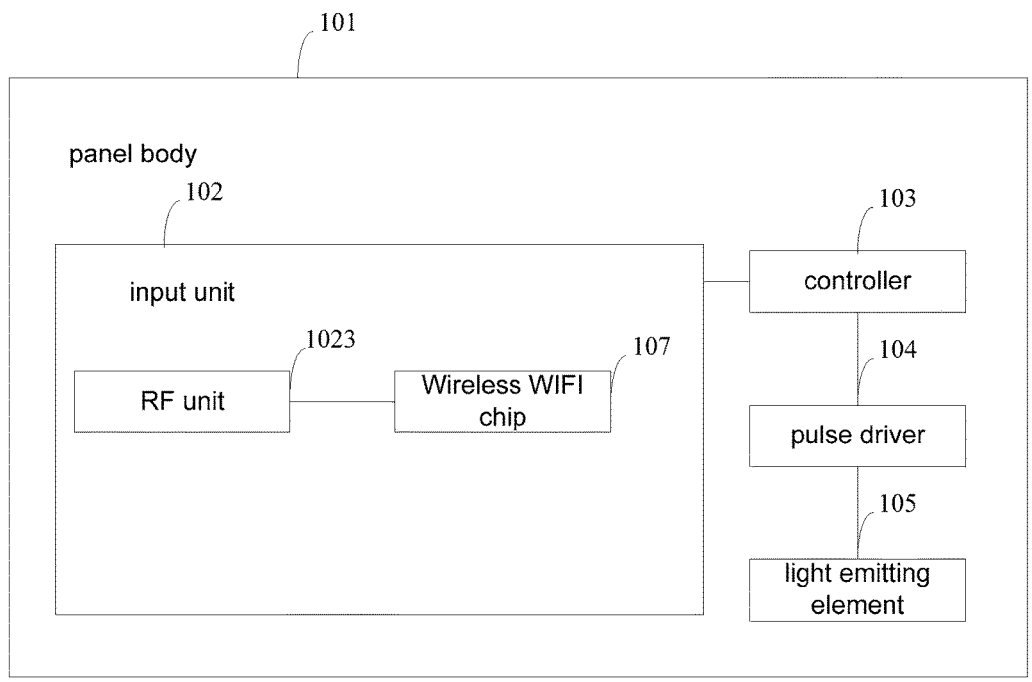
FIG. 3B is a further structural schematic diagram of a control panel according to an embodiment of the disclosure.

In an embodiment, when the input unit comprises the RF unit 1023, the RF unit is used for receiving a control instruction sent by an external apparatus (such as an IOS apparatus, for example). As the control instruction received by the RF unit 1023 is a wireless RF signal which can not be identified by the controller 103 in the control panel, the input unit may further comprises a wireless WiFi chip 107, referring to FIG. 3B.

In this case, the RF unit 1023 is used for forwarding the control instruction to the wireless WiFi chip 107.

The wireless WiFi chip 107 is used for converting the wireless RF signal into an analog signal which can be identified by the controller 103 and thus determining the object input information according to the control instruction, and sending the determined input information to the controller 103.

The controller 103, when having received the object input information sent by the wireless WiFi chip 107, may, according to the configuring data corresponding to the object input information, send the display instruction to the pulse driver 104 such that the pulse driver 104 may adjust the duty cycle to achieve adjustment of the current, thus controlling the light emitting element 105 to emit light.

In an embodiment of the disclosure, it may be configured that when an external apparatus sends a control instruction to the control panel, in order to provide an indication to the user, the configuring data may be configured such that the pulse driver 104 lights up the light emitting element 105 to provide the indication.

Accordingly, it may also be configured that when there is a connection error between the control panel and the external apparatus (for example, when the external apparatus is disconnected, or when the control instruction sent by the external apparatus can not be performed, etc.), the light emitting element 105 can be used to provide a warning color for warning.

Figure 4:
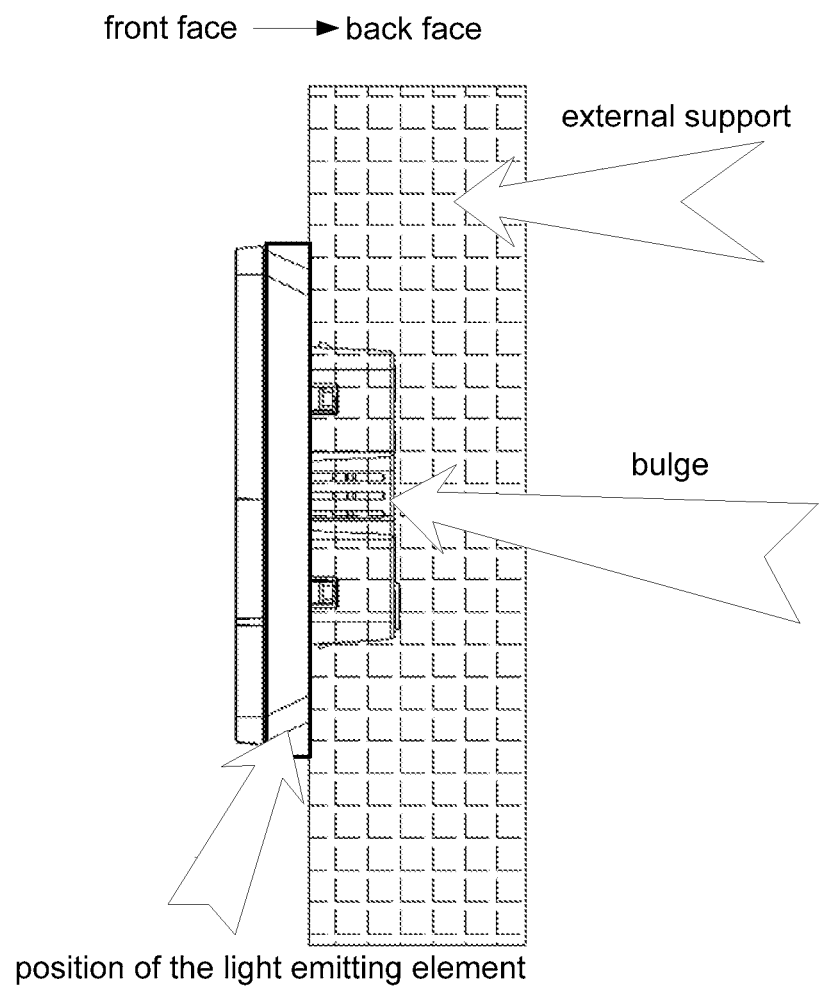
FIG. 4 is a schematic diagram illustrating the position relation of a control panel with an external support according to an embodiment of the disclosure.

In an embodiment of the disclosure, as the user will feel dazzling and uncomfortable when staring at the light emitting element 105 directly with his/her eyes even the light intensity of the light emitting element 105 is low, in order to enable the light emitting element 105 to provide the indication(s) or lighting to the user with relatively soft light and thus improve the comfort of the user when obtaining the indicating information, referring to FIG. 4, it is possible that the panel body 101 is provided, on its back face, with a bulge, the bulge is used for being embedded into an external support, and the light emitting element is placed at an outer periphery of the bulge. In this case, when the light emitting element 105 is lighting, the user will not directly stare at the light emitting element, rather, the light of the light emitting element will be reflected back by the external support, resulting in relatively soft light of the light emitting element and thus improving the comfort of the user's eyes.

In an embodiment of the disclosure, the pulse driver 104 may, according to the display instruction sent by the controller 103, adjust the duty cycle of the pulse, thus achieving adjustment of the output current. In this case, the pulse driver may be any apparatus or electric circuit which can adjust the output current and thus control the light emitting element to emit light. For example, the pulse driver may comprise an NCP5623 chip; the light emitting element 105 may comprise at least one three-primary-colors LED.

Figure 5:
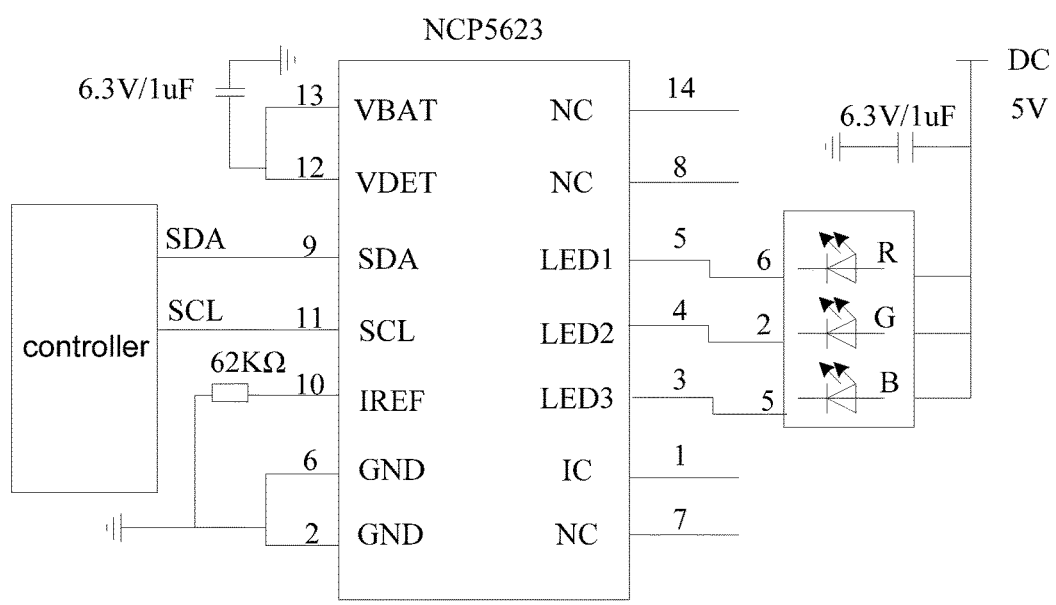
FIG. 5 is a schematic diagram of electric circuit connection of a controller with a pulse driver and a light emitting element according to an embodiment of the disclosure.

In this case, the NCP5623 chip may comprise an SDA port and an SCL port. Therefore, the controller 103 may be connected, via a datum signal terminal (SDA) and a clock signal terminal (SCL), with the SDA port and the SCL port of the pulse driver, respectively. The at least one three-primary-colors LED may be connected with an LED port of the pulse driver 104, referring to FIG. 5.

In this case, the NCP5623 chip may be shaped as 2.0 mm×2.0 mm×0.55 mm, LGA-14 lead-free mounted. It is an LED driver with efficient three-way outputs, having an 12C interface and enabling a build-in progressive light adjusting function. Such element is specially designed to drive the three-primary-colors RGBLED decorating light and the enhanced LCD backlight of portable products such as a mobile phone or a MP3 player. It can receive the instruction(s) from the processor via its 12C interface and operate automatically. Its three-way control current outputs are independent with respect to one another, and each control current output has a typical matching tolerance of ±0.5% and 32 current grades such that more than 32000 colors can be displayed by one three-primary-colors LED. The element incorporates the progressive light adjusting function and can gradually increase or decrease the output current, thus creating a theater effect of fade-in/fade-out. As a logarithm current algorithm is included, such element can ensure the light luminance and color change presented in a smooth and progressive manner. It also has a protection function for shorting and over-voltage, thus protecting the system when the three-primary-colors LED is out of order.

In an embodiment of the disclosure, it may be configured that when the control panel is starting to operate, the controller 103 and the pulse driver 104 control the light emitting element 105 to emit light and its light intensity may gradually increase according to the starting process of the control panel.

In an embodiment of the disclosure, the light emitting element 105 may be configured to emit light in a certain manner when the control panel is in a certain mode, such as a good morning mode (6:30-7:00 in the morning) or a good night mode (22:00-22:30 at night), for example. In the good morning mode, the light emitting element 105 may emit red light to indicate the current mode to the user; while in the good night mode, the light emitting element 105 may emit blue light to indicate the current mode to the user. Certainly, other light emitting effects may be configured to provide the indication to the user.

In the embodiment, the control panel may control the light emitting element 105 to achieve the single color effect, the multiple colors effect, the whole light luminance variation effect, the breathing light effect, the loop flowing effect formed by a circle of light beads lighting one by one, the light circle effect, etc.

Figure 6:
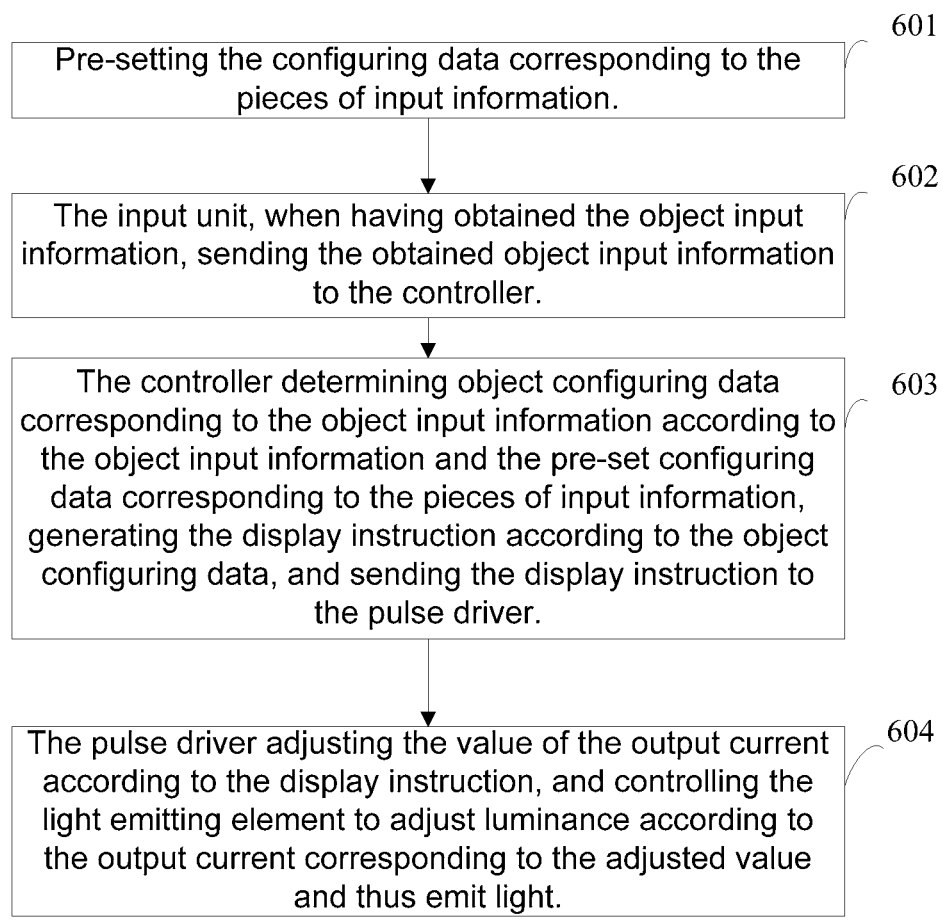
FIG. 6 is a schematic flowchart of a controlling method according to an embodiment of the disclosure.

In combination with the control panel in the above embodiment(s), according to an embodiment of the disclosure, a controlling method is provided. Referring to FIG. 6, the method may comprise the following steps:

Step 601: pre-setting the configuring data corresponding to the various input information.

Step 602: the input unit, when having obtained the object input information, sending the obtained object input information to the controller.

Step 603: the controller determining object configuring data corresponding to the object input information according to the object input information and the pre-set configuring data corresponding to the various input information, generating the display instruction according to the object configuring data, and sending the display instruction to the pulse driver.

Step 604: the pulse driver adjusting the value of the output current according to the display instruction, and controlling the light emitting element to adjust luminance according to the output current corresponding to the adjusted value and thus emit light.

Preferably, when the input unit comprises an infrared sensor, the controlling method further comprises: presetting a first threshold; and the step of the input unit, when having obtained the object input information, sending the obtained object input information to the controller, comprises: the infrared sensor determining a first object input information according to the relation between the first threshold and a detected distance from a user to the control panel, and sending the first object input information to the controller;

and/or when the input unit comprises an infrared sensor, the controlling method further comprises: presetting a second threshold; and the step of the input unit, when having obtained the object input information, sending the obtained object input information to the controller, comprises: the infrared sensor determining a second object input information according to the relation between the second threshold and a detected intensity of the light ray of the surroundings, and sending the second object input information to the controller;

and/or when the input unit comprises at least one press button, the step of the input unit, when having obtained the object input information, sending the obtained object input information to the controller, comprises: a detecting unit, when one or more of the at least one press button is detected to perform a touch control operation, determining information of the press button(s) performing the touch control operation(s) and sending the determined information as a third object input information to the controller;

and/or when the input unit comprises an RF unit, the step of the input unit, when having obtained the object input information, sending the obtained object input information to the controller, comprises: the RF unit receiving a control instruction sent by an external apparatus and forwarding the control instruction to a wireless WiFi chip, the wireless WiFi chip determining a fourth object input information according to the control instruction and sending the determined fourth object input information to the controller.

Preferably, when the panel body is provided on its back face with a bulge, the bulge is used for being embedded into an external support and the light emitting element is placed at an outer periphery of the bulge, the controlling method further comprises: after the step of controlling a light emitting element to emit light according to the output current corresponding to the adjusted value, reflecting the light from the light emitting element onto the external support to provide an indication to the user;

and/or when the pulse driver comprises an NCP5623 chip and the light emitting element comprises at least one three-primary-colors LED, the step of sending the display instruction to a pulse driver comprises: according to the display instruction, the controller sending a datum signal and a clock signal, by a datum signal terminal (SDA) and a clock signal terminal (SCL), to an SDA port and an SCL port of the pulse driver, respectively; and the step of controlling the light emitting element to emit light according to the output current corresponding to the adjusted value comprises: according to the output current corresponding to the adjusted value, the pulse driver sending the current via an LED port to the at least one three-primary-colors LED to make the at least one three-primary-colors LED emit light.

In summary, in the embodiment(s) of the disclosure, at least one of the beneficial effects can be achieved as follows:

1. In the embodiment(s) of the disclosure, the controller can, according to the pre-stored configuring data corresponding to various input information, determine different configuring data corresponding to the different input information, to generate the display instruction according to the configuring data. As the configuring data are different, the display information of the light emitting element will be different. The pulse driver may be used to adjust the value of the output current such that the adjusted value of the current can be used to control the light emitting element to emit light according to the display instruction sent by the controller, thereby enabling adjustment of luminance of the light emitting element and thus improving the experience of the user.

2. In the embodiment(s) of the disclosure, the infrared sensor may be used for detecting the distance from the user to the control panel and/or the light intensity of the light ray of the surroundings of the control panel. Therefore, the control panel can control the light emitting element to achieve the respective lighting effect(s) such that the user can obtain the position of the control panel even when the light ray of the surroundings is relatively weak.

3. In the embodiment(s) of the disclosure, when the press button is detected, by the detecting unit, to perform a touch control operation, the light emitting element may be controlled to achieve the respective lighting effect such that the user can be informed that the touch control operation has been performed by the press button(s).

4. In the embodiment(s) of the disclosure, it may be configured that the panel body is provided, on its back face, with a bulge; the bulge is used for being embedded into an external support; the light emitting element is placed at an outer periphery of the bulge. Therefore, the user will not directly stare at the light emitting element, rather, the light of the light emitting element will be reflected back by the external support, resulting in relatively soft light of the light emitting element and thus improving the comfort of the user's eyes.

The information interaction between the units in the above apparatus and the performing processes thereof as well as other related contents belong to a general/same technical concept. Such contents can be specifically seen in the description of the embodiment(s) of method of the disclosure, and will not be repeated herein.

It should be noted that the terms of "first", "second", etc. are used herein only for distinguish one entity or operation from another entity or operation, rather than requiring or suggesting that there is a necessary actual relation or sequence between such entities or operations. Also, the terms of "comprise", "include" or any other variations thereof are used herein to cover the meaning of non-exclusive inclusion such that a process, a method, an article or a device including a plurality of factors will include these factors, and may further include other factor(s) not specified, or the factor(s) inherent to such process, method, article or device. For a factor defined by the clause of "comprising a/an", the process, method, article or device including such factor may further include another same factor, unless there is a further definition thereto.

It is understandable to those skilled in the art that all or some of the steps for achieving the above method embodiment(s) may be achieved by the hardware associated with the program instructions. The above program may be stored in the computer readable storing media and when the program is performed, the step(s) of the above method embodiment(s) may be performed. The above storing media may comprise ROM, RAM, disc, or CD, or various media which can be used to store program codes.

Finally, it should be noted that the above description is provided only for illustrating the preferred embodiment(s) of the disclosure and only for explaining the technical solution(s) of the disclosure, but not for limiting the protection scope of the disclosure. Any modification, equivalent substitution or improvement based on the spirit and principle of the disclosure will fall in the protection scope of the disclosure.

The invention claimed is:

1. A control panel, comprising:
a panel body;
an input unit placed on the panel body, the input unit is configured to obtain object input information and send the obtained object input information to a controller;
the controller placed on the panel body, the controller is configured to determine object configuring data corresponding to the object input information according to the object input information and pre-stored configuring data, generate a display instruction according to the object configuring data, and send the display instruction to a pulse driver, where the pre-stored configuring data corresponds to various input information;
the pulse driver connected with the controller, the pulse driver is configured to adjust a value of an output current according to the display instruction and send the output current corresponding to the adjusted value to a light emitting element; and
the light emitting element placed on the panel body and connected with the pulse driver, the light emitting element is configured to adjust luminance according to the current output by the pulse driver and emit light.

2. The control panel according to claim 1, wherein the input unit comprises any one or more of an infrared sensor, at least one press button and an RF unit.

3. The control panel according to claim 2, wherein when the input unit comprises the infrared sensor,
the infrared sensor is used for detecting a distance from a user to the control panel by the infrared ray and sending the object input information to the controller according to the relation between the distance and a preset first threshold;
and/or
the infrared sensor is used for detecting the light ray of the surroundings and sending the object input information to the controller according to the relation between an intensity of the light ray and a preset second threshold.

4. The control panel according to claim 2, wherein when the input unit comprises the at least one press button,
the input unit further comprises a detecting unit, and when one or more of the at least one press button is detected to perform a touch control operation, the detecting unit is used for determining information of the press button(s) performed the touch control operation(s) and sending the determined information as the object input information to the controller.

5. The control panel according to claim 2, wherein when the input unit comprises the RF unit,
the input unit further comprises a wireless WiFi chip;
the RF unit is used for receiving a control instruction sent by an external apparatus and forwarding the control instruction to the wireless WiFi chip;
the wireless WiFi chip is used for determining the object input information according to the control instruction and sending the determined object input information to the controller.

6. The control panel according to claim 1, wherein
the panel body is provided, on its back face, with a bulge;
the bulge is used for being embedded into an external support;
the light emitting element is placed at an outer periphery of the bulge.

7. The control panel according to claim 2, wherein
the panel body is provided, on its back face, with a bulge;
the bulge is used for being embedded into an external support;
the light emitting element is placed at an outer periphery of the bulge.

8. The control panel according to claim 3, wherein
the panel body is provided, on its back face, with a bulge;
the bulge is used for being embedded into an external support;
the light emitting element is placed at an outer periphery of the bulge.

9. The control panel according to claim 4, wherein
the panel body is provided, on its back face, with a bulge;
the bulge is used for being embedded into an external support;
the light emitting element is placed at an outer periphery of the bulge.

10. The control panel according to claim 5, wherein
the panel body is provided, on its back face, with a bulge;
the bulge is used for being embedded into an external support;
the light emitting element is placed at an outer periphery of the bulge.

11. The control panel according to claim 1, wherein
the pulse driver comprises an NCP5623 chip;
the light emitting element comprises at least one three-primary-colors LED;
the controller is connected, via a datum signal terminal (SDA) and a clock signal terminal (SCL), with an SDA port and an SCL port of the pulse driver, respectively;
the at least one three-primary-colors LED is connected with an LED port of the pulse driver.

12. The control panel according to claim 2, wherein
the pulse driver comprises an NCP5623 chip;
the light emitting element comprises at least one three-primary-colors LED;
the controller is connected, via a datum signal terminal (SDA) and a clock signal terminal (SCL), with an SDA port and an SCL port of the pulse driver, respectively;
the at least one three-primary-colors LED is connected with an LED port of the pulse driver.

13. The control panel according to claim 3, wherein
the pulse driver comprises an NCP5623 chip;
the light emitting element comprises at least one three-primary-colors LED;
the controller is connected, via a datum signal terminal (SDA) and a clock signal terminal (SCL), with an SDA port and an SCL port of the pulse driver, respectively;
the at least one three-primary-colors LED is connected with an LED port of the pulse driver.

14. The control panel according to claim 4, wherein
the pulse driver comprises an NCP5623 chip;
the light emitting element comprises at least one three-primary-colors LED;

the controller is connected, via a datum signal terminal (SDA) and a clock signal terminal (SCL), with an SDA port and an SCL port of the pulse driver, respectively;

the at least one three-primary-colors LED is connected with an LED port of the pulse driver.

15. The control panel according to claim 5, wherein the pulse driver comprises an NCP5623 chip;

the light emitting element comprises at least one three-primary-colors LED;

the controller is connected, via a datum signal terminal (SDA) and a clock signal terminal (SCL), with an SDA port and an SCL port of the pulse driver, respectively;

the at least one three-primary-colors LED is connected with an LED port of the pulse driver.

16. A controlling method of the control panel according to claim 1, comprising:

pre-setting the configuring data corresponding to various input information;

the input unit, when having obtained the object input information, sending the obtained object input information to the controller;

the controller determining object configuring data corresponding to the object input information according to the object input information and the pre-set configuring data corresponding to the various input information, generating the display instruction according to the object configuring data, and sending the display instruction to the pulse driver;

the pulse driver adjusting the value of the output current according to the display instruction and controlling the light emitting element to adjust luminance according to the output current corresponding to the adjusted value and thus emit light.

17. The controlling method according to claim 16, wherein when the input unit comprises an infrared sensor, the controlling method further comprises: presetting a first threshold;

the step of the input unit, when having obtained the object input information, sending the obtained object input information to the controller, comprises: the infrared sensor determining a first object input information according to the relation between the first threshold and a detected distance from a user to the control panel, and sending the first object input information to the controller;

and/or when the input unit comprises an infrared sensor, the controlling method further comprises: presetting a second threshold; and the step of the input unit, when having obtained the object input information, sending the obtained object input information to the controller, comprises: the infrared sensor determining a second object input information according to the relation between the second threshold and a detected intensity of the light ray of the surroundings, and sending the second object input information to the controller;

and/or when the input unit comprises at least one press button, the step of the input unit, when having obtained the object input information, sending the obtained object input information to the controller, comprises: a detecting unit, when one or more of the at least one press button is detected to perform a touch control operation, determining information of the press button(s) performing the touch control operation(s) and sending the determined information as a third object input information to the controller;

and/or when the input unit comprises an RF unit, the step of the input unit, when having obtained the object input information, sending the obtained object input information to the controller, comprises: the RF unit receiving a control instruction sent by an external apparatus and forwarding the control instruction to a wireless WiFi chip, the wireless WiFi chip determining a fourth object input information according to the control instruction and sending the determined fourth object input information to the controller.

18. The controlling method according to claim 16, wherein when the panel body is provided on its back face with a bulge, the bulge is used for being embedded into an external support and the light emitting element is placed at an outer periphery of the bulge, the controlling method further comprises: after the step of controlling a light emitting element to emit light according to the output current corresponding to the adjusted value, reflecting the light from the light emitting element onto the external support to provide an indication to the user;

and/or when the pulse driver comprises an NCP5623 chip and the light emitting element comprises at least one three-primary-colors LED, the step of sending the display instruction to a pulse driver comprises: according to the display instruction, the controller sending a datum signal and a clock signal, by a datum signal terminal (SDA) and a clock signal terminal (SCL), to an SDA port and an SCL port of the pulse driver, respectively; and the step of controlling the light emitting element to emit light according to the output current corresponding to the adjusted value comprises: according to the output current corresponding to the adjusted value, the pulse driver sending the current via an LED port to the at least one three-primary-colors LED to make the at least one three-primary-colors LED emit light.

19. The controlling method according to claim 17, wherein when the panel body is provided on its back face with a bulge, the bulge is used for being embedded into an external support and the light emitting element is placed at an outer periphery of the bulge, the controlling method further comprises: after the step of controlling a light emitting element to emit light according to the output current corresponding to the adjusted value, reflecting the light from the light emitting element onto the external support to provide an indication to the user;

and/or when the pulse driver comprises an NCP5623 chip and the light emitting element comprises at least one three-primary-colors LED, the step of sending the display instruction to a pulse driver comprises: according to the display instruction, the controller sending a datum signal and a clock signal, by a datum signal terminal (SDA) and a clock signal terminal (SCL), to an SDA port and an SCL port of the pulse driver, respectively; and the step of controlling the light emitting element to emit light according to the output current corresponding to the adjusted value comprises: according to the output current corresponding to the adjusted value, the pulse driver sending the current via an LED port to the at least one three-primary-colors LED to make the at least one three-primary-colors LED emit light.

* * * * *